May 19, 1931.                C. E. STILLE                1,806,372
                ADJUSTABLE PRESSURE INDICATOR FOR TIRES
                        Filed Oct. 4, 1929
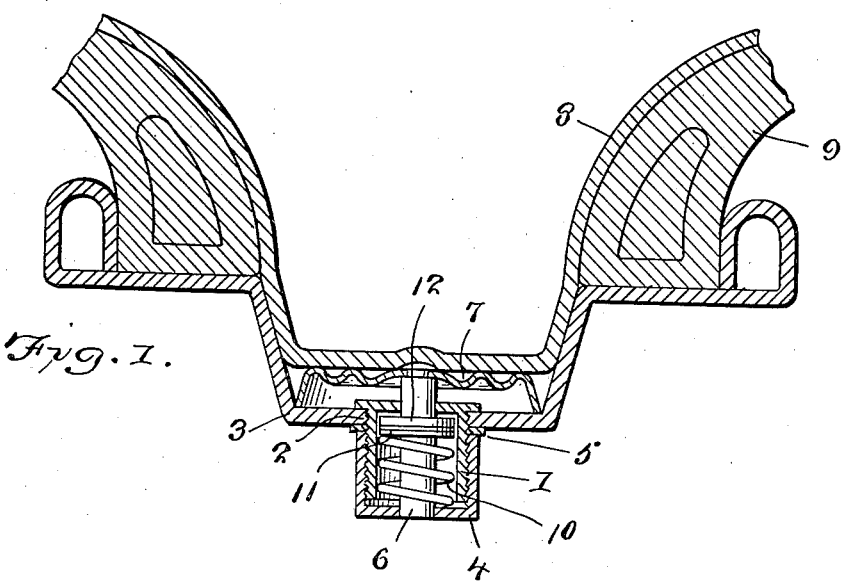
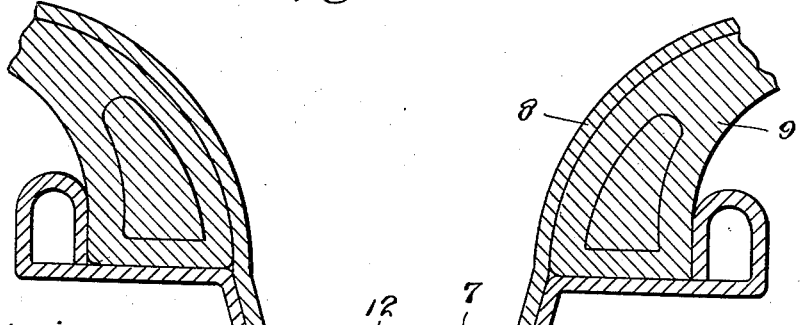
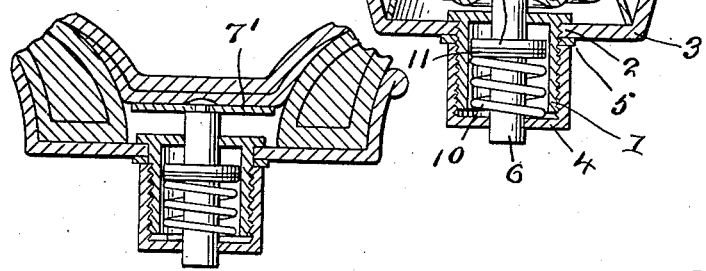
C. E. Stille
INVENTOR
BY Victor J. Evans
ATTORNEY Patented May 19, 1931

1,806,372

UNITED STATES PATENT OFFICE

CORSVILLE E. STILLE, OF TUCKAHOE, NEW JERSEY

ADJUSTABLE PRESSURE INDICATOR FOR TIRES

Application filed October 4, 1929. Serial No. 397,265.

This invention relates to a pressure gauge for pneumatic tires, the general object of the invention being to provide a gauge which is attached to the rim of the wheel and is not in communication with the tube so that the gauge is always attached to the wheel and there is no danger of leakage of the tube as there would be if the gauge was in communication with the interior thereof.

Another object of the invention is to so construct the gauge that it can be manufactured to sell at low cost, it can be easily and quickly attached to the rim and removed therefrom without interfering with the use of the rim when removed and one which will permit the condition of inflation of the tire to be ascertained by sight or sense of touch.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a sectional view through a portion of a rim of a wheel and its tire, showing the invention in use.

Figure 2 is a similar view, but showing the device in operative position by the inflation of the tube.

Figure 3 is a sectional view showing a modification.

In these views, the numeral 1 indicates a cylindrical shaped body having its inner end closed and formed with a flange so that the body can be passed through a hole 2 formed in the rim 3 of the wheel, with its flange engaging a part of an inner wall of the rim and 4 indicates a cap threaded on the projecting part of the body and bearing against a gasket 5 which is placed between the rim and the cap. Thus the parts are fastened to the rim in a leak-proof manner.

A rod 6 passes through a hole in the closed end of the body and through a hole in the end of the cap and that end which is located in the space formed by the rim fastened to a diaphragm washer 7 which is placed between the rim and the tube 8 of the tire 9. The rod can be connected with the washer in any desired manner, but the drawings show the reduced end of the rod upset on the washer.

A coil spring 10 is placed in the body and encircles the rod and bears against an adjacent washer of a number of washers 11 placed on the rod, with one of the washers bearing against a collar 12 formed on said rod. This spring 10 tends to counteract movement of the washer 7 by the pressure from the tube so that by placing the proper number of washers 11 between the end of the spring and the collar 12, the pressure at which the tube will compress the diaphragm washer 7 can be regulated.

From the foregoing it will be seen that when the tube 8 is inflated to the degree for which the gauge or indicator is set, the rod 6 will project from the cap so that one can tell approximately when the tube is properly inflated by either sight or touch. If the tube becomes wholly or partially deflated, the diaphragm washer will draw the rod back into the cap, as shown in Figure 1, so one will know that the tire needs further inflation. It will, of course, be understood that if desired, the rod can be graduated to indicate the pressure in the tube, though I prefer to so form the parts that the fact that the rod projects from the device will indicate that the tire is properly adjusted and that when the rod is flush with the cap, that the tire needs further inflation. In this way, one can tell by the sense of touch whether the tire needs inflation so that he can tell at night the condition of the tire as well as during the day.

As will be seen, the device can be manufactured to sell at low cost, it can be easily installed and when removed, will not interfere with the use of the rim.

Figure 3 shows the invention used on a different form of rim from that shown in the other views and in this case, the diaphragm washer is replaced by a plain washer 7'. In other respects, this form of the invention is the same as that before described.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

An adjustable pressure indicator for tires comprising a cylindrical shaped body extending through a rim and having one end closed and flanged to engage one face of the rim and provided with a centrally arranged opening in the closed end, a second cylindrical shaped body threaded on the first body and bearing against the opposite face of the rim from that engaged by the flanged end of the first body and having one end closed and provided with a centrally arranged opening aligning with the first opening, a rod slidable in the openings, a diaphragm member secured to one end of the rod and engaging the pneumatic tube of a tire mounted on the rim, a disk fixed to the rod within the bodies, a coil spring to counteract the action of the diaphragm member and mounted on the rod between the disk and the closed end of the second body, and adjusting washers on the rod between the disk and one end of the spring to permit varying of the tension of the spring and consequently vary the movement of the rod by the action of the diaphragm member.

In testimony whereof I affix my signature.

CORSVILLE E. STILLE.